June 9, 1931. F. WILKENS 1,808,974
MEANS FOR CABLE LAYING
Filed Sept. 21, 1929
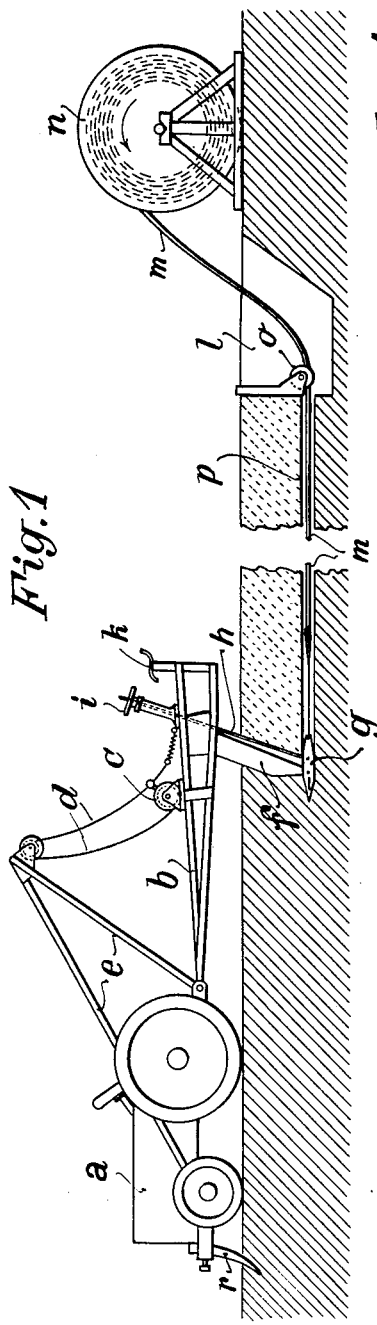
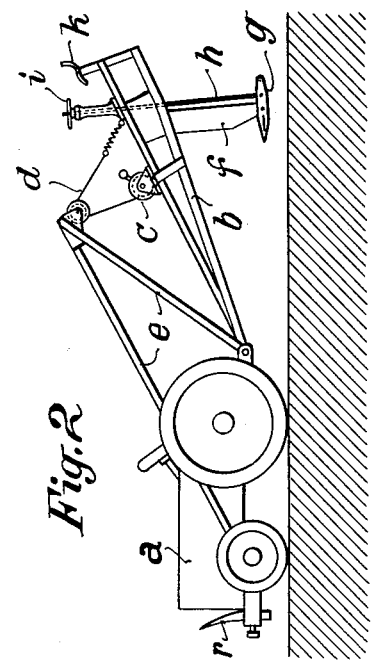
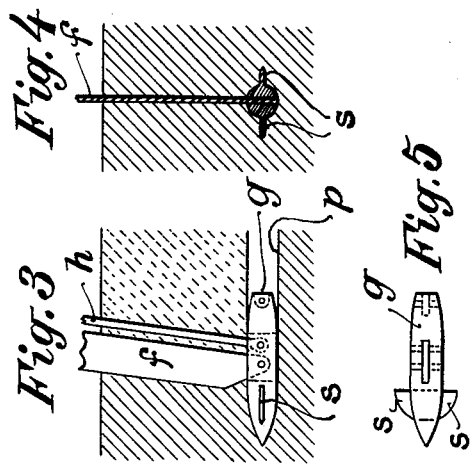
Inventor
Ferdinand Wilkens
by
S. Sokal,
Attorney.

Patented June 9, 1931

1,808,974

UNITED STATES PATENT OFFICE

FERDINAND WILKENS, OF MELDORF, HOLSTEIN, GERMANY

MEANS FOR CABLE LAYING

Application filed September 21, 1929, Serial No. 394,293, and in Germany April 18, 1928.

The present invention relates to means for laying underground cables, pipe lines and like articles at a distance below the surface of the soil without digging out the soil, of the kind in which a tractor and a knife-like member are employed.

The principal object of the invention is to provide an implement for laying underground cables, pipe lines and like articles, of the kind set forth, comprising in combination: a tractor; a swinging carrier beam pivotally mounted on said tractor; a knife-shaped supporting member attached to said carrier beam at the end remote from the pivot thereof; and mandrel means mounted on said knife-shaped supporting member for producing a closed underground channel by radial displacement and compression of the soil, said mandrel means having a greater diameter than the thickness of said knife-shaped supporting member and having the cable attached to it to enable the cable to be drawn into the underground channel.

The cable or like conductor may for instance be delivered from a stationary drum. It will be understood that the knife or cutter carrying the channel producing mandrel or tool at the required distance from the surface of the soil, merely makes a slit in the soil, but does not serve for digging out any channel. The channel itself is entirely produced by the mandrel or like tool carried by the knife, the earth or soil being at the same time compressed round the channel.

In one construction suitable for carrying out the invention a power driven vehicle is provided with an adjustable carrier beam on which is mounted a knife or cutter of suitable construction adapted to cut through the soil whilst being moved along by the vehicle. At or near the lower end of the knife there is mounted upon the knife a pointed mandrel of a suitable size for producing the required channel by being moved through the soil. The angle between the supporting knife and the mandrel is preferably adjustable during the operation by means adapted to be controlled from the driver's seat. The cable or like support is fixed to the rear or trailing end of the mandrel and may be supplied from a stationary drum.

The accompanying drawings show by way of example an implement or machine suitable for carrying out the invention.

Fig. 1 shows the complete implement or machine in elevation, partly in section, the parts being shown in the working position.

Fig. 2 is an elevation showing the carrier beam, knife and mandrel in lifted position.

Figs. 3, 4 and 5 show the mandrel in detail in elevation, front view and plan.

Upon a wheeled carriage $a$ of any suitable kind which may be a power driven caterpillar tractor, there is pivotally mounted a carrier beam $b$ which is suspended by means of a cable $d$ and a hand winch $c$ from a jib arm $e$ mounted upon the carriage $a$. Upon the carrier beam $b$ is mounted a downwardly extending knife or cutter $f$ which carries near or upon its lower end a mandrel or drifting tool $g$ which may be angularly adjusted about a horizontal pivot relatively to the knife $f$ by means of a rod $h$. The upper end of the rod $h$ may be screw threaded and engage a nut in a hand wheel $i$ adapted to be controlled from the driver's seat $k$ so that the angle of the mandrel may, during the operation, be easily adjusted by turning the wheel $i$. In order to guide the mandrel during the operation and in order to prevent dropping of the mandrel when working in muddy or soft soil, there are provided upon the mandrel lateral guide wings $s$. These wings may be arranged either horizontally or at any required inclination to the horizontal plane. The wings may extend either as shown over only a small part of the mandrel or they may extend over the whole length, and they may be removably fixed to the mandrel so that they can be readily taken off, if the nature of the soil does not require any additional guiding of the mandrel. The channel produced by the mandrel $g$ is indicated by $p$ and is, as a rule, of a section considerably larger than the section of the cable $m$ or like conductor to be inserted into the channel. The cable $m$ is fixed to the mandrel and is delivered from a stationary drum $n$ being preferably guided at the entrance to the channel by a guide roller $o$. $l$ indicates a cavity which is dug into the ground before the operation is started.

The operation is as follows:

A cavity $l$ of considerable depth is first made in the soil and the drum $n$ containing the cable $m$ as well as the guide roller $o$ are fixed in position. The knife $f$ is then inserted in the soil and the cable is fixed to the trailing end of the mandrel. The tractor $a$ is then moved in the required direction, whereby the knife is moved through the soil, merely cutting a thin slit in the soil. The mandrel makes a channel $p$ in the required distance from the surface of the soil and the cable is at the same time unwound from the drum and inserted into the channel.

The operator controls the implement by means of a winch $c$ regulating the depth at which the channel is made and by means of the wheel $i$ regulating the angle at which the mandrel operates.

It will be understood that pipe lines may be laid in the same manner, and if such lines are to be laid at a certain constant angle or drop, two vertical sight marks may be arranged which during the operation are sighted by the operator through a suitable sight mounted upon the carrier beam $b$.

It will also be understood that the machine may be used for making a channel only, the cable or other conductor being afterwards inserted into the channel by separate means.

In order to facilitate the operation of the implement when working over country roads or a surface containing stones, and in order to avoid injury to the knife $f$ that might in such cases be caused by the nature of the upper surface of the soil, an additional cutter $r$ may be fixed in front of the tractor, such additional cutter acting merely upon the top layer of the soil. This additional cutter $r$ should be either vertically adjustable or easily removably.

I claim:

1. An implement for laying underground cables, pipe lines and like articles in the ground at a distance below the surface of the soil, comprising in combination: a tractor; a swinging carrier beam pivotally mounted on said tractor; a knife-shaped supporting member attached to said carrier beam at the end remote from the pivot thereof; and mandrel means mounted on said knife-shaped supporting member, for producing a closed underground channel by radial displacement and compression of the soil, said mandrel means having a greater diameter than the thickness of said knife-shaped supporting member and having the cable attached to it to enable the cable to be drawn into the underground channel.

2. An implement for laying underground cables, pipe lines and like articles in the ground at a distance below the surface of the soil, comprising in combination: a tractor; a swinging carrier beam pivotally mounted on said tractor; a knife-shaped supporting member attached to said carrier beam at the end remote from the pivot thereof; and mandrel means mounted on said knife-shaped supporting member so as to be rotatable about a horizontal axis, for producing a closed underground channel by radial displacement and compression of the soil, said mandrel means having a greater diameter than the thickness of said knife-shaped supporting member and having the cable attached to it to enable the cable to be drawn into the underground channel; a screwed spindle connecting the end of said mandrel means with said carrier beam; and a screwed hand wheel co-operating with said spindle to enable the inclination of said mandrel means with regard to the surface of the soil to be varied.

3. An implement for laying underground cables, pipe lines and like articles in the ground at a distance below the surface of the soil, comprising in combination: a tractor; a swinging carrier beam pivotally mounted on said tractor; a knife-shaped supporting member attached to said carrier beam at the end remote from the pivot thereof; and mandrel means mounted on said knife-shaped supporting member, for producing a closed underground channel by radial displacement and compression of the soil, said mandrel means having a greater diameter than the thickness of said knife-shaped supporting member and having the cable attached to it to enable the cable to be drawn into the underground channel; and adjustable interchangeable lateral guide vanes on said mandrel means.

4. An implement for laying underground cables, pipe lines and like articles in the ground at a distance below the surface of the soil, comprising in combination: a tractor; a swinging carrier beam pivotally mounted on said tractor; a knife-shaped supporting member attached to said carrier beam at the end remote from the pivot thereof; and mandrel means mounted on said knife-shaped supporting member so as to be rotatable about a horizontal axis, for producing a closed underground channel by radial displacement and compression of the soil, said mandrel means having a greater diameter than the thickness of said knife-shaped supporting member and having the cable attached to it to enable the cable to be drawn into the underground channel; a screwed spindle connecting the end of said mandrel means with said carrier beam; a screwed hand wheel co-operating with said spindle to enable the inclination of said mandrel means with regard to the surface of the soil to be varied; and adjustable interchangeable lateral guide vanes on said mandrel means.

Signed at Hamburg, Germany, this 7th day of September, 1929.

FERDINAND WILKENS.